Sept. 28, 1965 A. M. BINKIS 3,209,278
MILLER EFFECT VOLTAGE SENSITIVE CAPACITANCE AFC SYSTEM
Filed Nov. 14, 1962
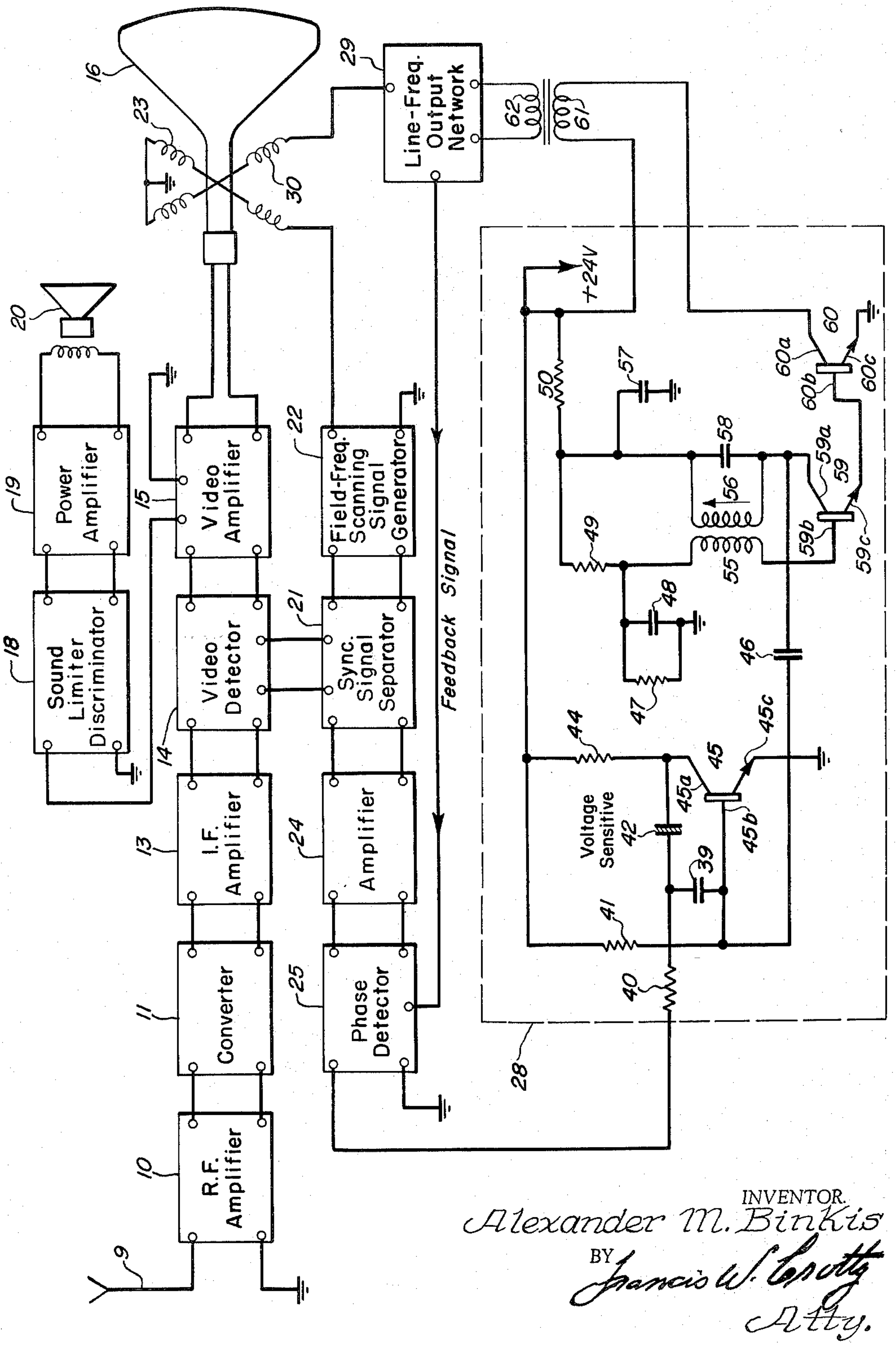
INVENTOR.
Alexander M. Binkis
BY Francis W. Crotty
Atty.

3,209,278
MILLER EFFECT VOLTAGE SENSITIVE CAPACITANCE AFC SYSTEM

Alexander M. Binkis, Westchester, Ill., assignor to Zenith Radio Corporation, Chicago, Ill., a corporation of Delaware Filed Nov. 14, 1962, Ser. No. 237,621
2 Claims. (Cl. 331—20)

This invention relates to automatic frequency control appartus and more particularly to an automatic frequency control circuit which may be employed to control the line frequency scanning oscillator of a television receiver.

It is of importance to keep certain signal generating components of the receiver in phase with corresponding components of a television transmitting station which radiates a signal having sound, video and synchronizing components. For example, the transmitted synchronizing components are customarily employed to keep the line frequency and field frequency generators of the receiver in synchronism with the transmitting equipment. In accomplishing this result, it is conventional practice to compare the transmitted synchronizing information with locally generated signals to produce an error signal indicative of their phase relation. This error signal is applied to a variable reactance of resistive device which changes the operating frequency of the generator in order to establish and maintain a preselected phase relation. In receivers employing vacuum tubes, reactance or control tubes respond to the error signal to control phase but they are not practical for use in transistor-type television receivers.

Another solution to the problem of automatic frequency or phase control, which has application to transistorized receivers, has been the use of variable inductors of the saturable reactor type similar to those found in motor controls. By applying a direct current control or error signal to a control winding of the reactor, the permeability of the core may be varied effectively changing its reactance. The primary disadvantage in this approach is the cost of the resulting structure.

In lieu of the reactance tube or variable inductor, voltage sensitive variable capacitors have been employed to adjust the local oscillator of frequency modulation radio receivers. These devices have proved to be satisfactory in such receivers because the operating frequency is in the megacycle range wherein a small change in capacitance provides a rather substantial change in reactance. However, the horizontal oscillator of a television receiver operates at approximately 15 kilocycles and the capacitance variation directly obtainable at this frequency with currently available voltage-sensitive capacitive devices is insufficient.

It is, therefore, an object of this invention to provide a new and improved automatic frequency control circuit.

It is a further object of this invention to provide a new and improved circuit employing a voltage-sensitive variable capacitor device for controlling the local oscillator of a television receiver.

It is still another object of this invention to provide a new and improved circuit for controlling the local oscillator of a transistor television receiver which is both simple and economical to construct.

Most conventional automatic frequency control circuits include a source of reference signal, a generator for producing a local signal the phase of which may be varied and means for comparing the phase of the reference signal and the local signal to produce an error signal indicative of their phase relation. In accordance with the invention, the improvement in the automatic frequency control circuit comprises a capacitive reactance, variable through a range of capacitance values, for changing the frequency of the local signal generator. The improvement further comprises means responsive to the instantaneous value of the capacitance for increasing its instantaneous value and means for applying the error signal to the capacitive reactance to vary its value.

The features of this invention which are believed to be novel are set forth with particularity in the appended claims. The invention, together with further objects and advantages thereof, may best be understood, however, by reference to the following description taken in conjunction with the accompanying drawing, in the single figure of which is shown a schematic diagram of a television receiver embodying the automatic frequency control apparatus of the invention.

The receiver shown comprises a receiving antenna 9 coupled to a radio-frequency amplifier 10 of one or more stages which includes means for selecting one of the transmitted signals. The selected signal is coupled from amplifier 10 to a converter 11 which provides an intermediate-frequency signal. The output of the converter is translated to an intermediate-frequency amplifier 13 of one or more stages and a video detector 14 is coupled thereto to receive the amplified intermediate-frequency signal. Coupled to the output of video detector 14 is a video amplifier 15 which translates the amplified detected video components to a cathode-ray tube or other image reproducing device 16. An intercarrier-sound signal component also derived by detector 14 and amplified by video amplifier 15 is translated to a limiter-discriminator 18 which is coupled between amplifier 15 and a power amplifier 19. A speaker 20 is coupled to the output of power amplifier 19 in conventional fashion.

Video detector 14 is also provided with an output for translating detected field and line synchronizing signal components present in the intermediate-frequency signal. A synchronizing-signal-separator 21 is coupled to this output and provides information for synchronizing the scanning apparatus associated with image reproducing device 16. A field-frequency scanning signal generator 22 is coupled to one output of sync-signal-separator 21 and the conventional field frequency scanning coils 23 are coupled to its output terminals. A line frequency signal translating network comprises the series arrangement of an amplifier 24, a phase detector 25 and an oscillator 28. These networks are coupled between sync-signal-separator 21 and a line frequency output network 29. Oscillator 28 produces a local signal which is variable in phase by frequency adjustment of the oscillator in accordance with the invention as will be described more particularly subsequently. A conventional line frequency deflection coil 30 is coupled to line frequency output network 29. In addition, line frequency output network 29 provides a feedback signal, representative of the locally developed signal, to phase detector 25 which produces an error signal indicative of the phase between the locally generated signal and the incoming signal. If desired, automatic gain control of the radio frequency and intermediate frequency stages may be provided.

The described receiver, except for its automatic frequency or phase control arrangement, is conventional. The incoming composite television signals intercepted by antenna 9 are applied to and amplified by radio-frequency amplifier 10. The selected signal is applied to converter 11 which heterodynes it with locally generated oscillations to develop an intermediate-frequency signal which is amplified by amplifier 13. This amplified signal is applied to video detector 14 which derives the synchronizing, video and sound components. The video and sound components are translated to video amplifier 15 which provides amplified video components for use by image reproducer 16. The sound components, in the form of a frequency modulated intercarrier signal, are supplied to limiter and discriminator 18, wherein the audio components are derived and after amplification by power amplifier 19 they drive speaker 20 which reproduces the audio portion of the telecast.

The synchronizing signal components supplied by detector 14 are separated into line and field components, the field frequency components being translated to generator 22 which provides a deflection signal for the field or vertical yoke 23. The horizontal synchronizing output of signal separator 21 serves as a source of reference signal which is applied through amplifier 24 to phase detector 25. This detector comprises means for comparing the phase of the reference signal and the local signal of horizontal frequency generator 28 to produce an error signal indicative of their phase relation. The locally generated horizontal signal is delivered to the phase detector through the feedback connection from line frequency output network 29. The error signal developed in the phase detector is employed to control the operating frequency of line frequency generator 28. The output of generator 28 is supplied to network 29 which supplies a deflection signal to horizontal yoke 30.

More particular consideration will now be given to the automatic frequency control arrangement including the sine-wave oscillation generator 28, which comprises a transistor 45 of NPN configuration having a collector 45*a*, a base 45*b* and an emitter 45*c*. The collector is coupled through a load resistor 44 to a suitable source of positive potential so that it is reversed biased. A biasing resistor 41 is also coupled to the positive potential and provides a forward bias voltage for base electrode 45*b*. A direct current blocking capacitor 39 and a voltage sensitive variable capacitor 42 are series connected between collector 45*a* and base 45*b* while an isolating resistor 40 translates the error signal from network 25 to the junction of these two capacitors. Resistor 40 prevents oscillatory signals, to be discussed subsequently, from reaching the phase detector 25 and serves as means for applying the error signal of the phase detector to capacitor 42 to vary its value. The capacitive reactance of capacitor 42 is variable through a range of values for changing the frequency of the local signal generator; structurally, it may conveniently take the form of a backwardly biased PN junction diode. Transistor 45 and its associated components serve as a conventional amplifier, however, by employing the well-known principle of the Miller effect, the value of the input capacitance of the amplifier measured at the emitter and base electrodes is a multiplication of the capacitance between the collector and base electrodes. As the value of capacitor 39 is large, the collector-base capacitance is primarily that of variable capacitor 42. The transistor 45 serves as means, responsive to the instantaneous value of the capacitance of capacitor 42, for increasing or multiplying that value to provide an effective value of capacitance which is greater than the instantaneous value of element 42.

The effective capacitance of the amplifier stage is coupled into a tank circuit comprising a capacitor 58 and inductor 56 by way of a capacitor 46. The capacitance of the multiplier amplifier is in parallel with tank circuit elements 56, 58. The inductor 56 is adjustable and serves as the horizontal hold control of the receiver. The tank circuit is shock excited by a current pulse received from oscillator transistor 59, also of NPN configuration, which has its collector electrode 59*a* coupled to the tank circuit. The current pulse is generated when the voltage developed in coil 55, which is flux coupled to inductor 56 and electrically coupled to base 59*b*, reaches a preselected value during each cycle of operation. The remaining end of the tank circuit is coupled to a voltage dropping resistor 50 which reduces the supply voltage presented to the collector of oscillator transistor 59. Resistor 47 and capacitor 48, which are connected in parallel between ground and a resistor 49, serve as a biasing network for the base 59*b* of the oscillator transistor. The remaining end of resistor 49 is coupled to the voltage dropping resistor 50. A bypass capacitor 57 is coupled between the tank circuit and ground and presents a low impedance path through transistor 59 for the oscillatory tank circuit signal. This low impedance path comprises the connection from the tank circuit elements, the collector and emitter of transistor 59, and the base 60*b* and emitter 60*c* of a driver transistor 60 through ground and capacitor 57. Driver transistor 60 is of NPN configuration and is a power amplifier which amplifies the current pulse developed by oscillator transistor 59 and applies it to the line frequency output network 29 by way of its collector electrode 60*a*. The amplified current pulse is delivered to a secondary winding 62 by way of a primary winding 61 which is coupled between the collector electrode 60*a* and the source of positive battery potential which serves as the collector voltage supply. Windings 61, 62 are in form of a step-down transformer so that a larger current pulse than delivered by transistor 60 is presented to the circuits of line frequency output network 29 for application to the horizontal deflection coils 30.

In considering the operation of the described automatic frequency control circuit, it will be assumed initially that the oscillations developed in horizontal generator 28 have the desired phase relation with respect to the horizontal synchronizing components of the received telecast. For these conditions, oscillation signal generator 59 develops in its emitter 59*c* a signal of substantially pulse waveform at a frequency primarily determined by its resonant circuit elements 55, 56, 58 and the effective capacitive value of the multiplier amplifier stage including transistor 45 and variable capacitor 42. Capacitor 46 contributes slightly to the resonant circuit capacitance but, in general, its value need not be taken into consideration. The pulse signal of oscillator 59 energizes driver transistor 60 which in turn energizes the horizontal deflection system of the receiver including the line frequency output network 29. Additionally, the oscillator causes a feedback signal to be applied to phase detector 25 where it is compared with the horizontal synchronizing components of the received signal. For the assumed condition of phase synchronism, the output of detector 25 is at a preselected voltage level which corresponds to the middle of the capacitance range of variable capacitor 42. The instantaneous value of the error signal determines the instantaneous value of capacitor 42. This value is effectively multiplied by amplifier transistor 45 due to the Miller effect resulting in an effectively increased value of capacitance appearing in parallel with capacitor 58. Theoretically, the multiplication factor may approximately be equal to the gain of the stage.

If it is now assumed that the oscillations developed in generator 59 are not in the desired phase relation with the received synchronizing components, the error signal developed in phase detector 25 changes from that obtained during the in phase condition. The sense of the change in error signal is determined by the sense of the phase change while the magnitude of the change reflects the extent of phase change as is customary. The change in error signal modifies the voltage applied to capacitor 42 to effect a related change in the value of its capacitance, thereby changing the frequency of the resonant circuit of oscillator 59. This change in the frequency of the resonant circuit restores the proper phase relation of the locally generated oscillations.

The oscillator network, including the resonant circuit elements and transistor 59 and its associated components, has a period which is determined by the resonant frequency of the tank circuit. Although the signal in the resonant tank circuit may suffer some distortion, the oscillator is still essentially a sine-wave oscillator whose output signal varies in phase or frequency in accordance with a change in the capacitance of the tank circuit. The current pulse developed by transistor 59 shock excites the tank circuit to keep it oscillating or ringing. This current pulse is also applied to the driver transistor 60 as previously explained. By connecting the emitter 59*c* directly to base 60*b*, the pulse transformer conventionally associated with transistor horizontal oscillator circuits is eliminated.

Merely by way of illustration and in no way by sense of limitation, the following devices and component values were employed in one operative embodiment of the arrangement shown in the figure:

| | |
|---|---|
| Transistor **45** | 2N915. |
| Transistor **59** | 2N915. |
| Transistor **60** | 2N2297. |
| Capacitor **39** | 3,300 micromicrofarads. |
| Capacitor **42** | PC137. |
| Range of capacitor **42** | 46–142 micromicrofarads. |
| Capacitor **46** | 1,500 micromicrofarads. |
| Capacitor **48** | .01 microfarad. |
| Capacitor **57** | .15 microfarad. |
| Capacitor **58** | 820 micromicrofarads. |
| Resistor **40** | 100,000 ohms. |
| Resistor **41** | 330,000 ohms. |
| Resistor **44** | 68,000 ohms. |
| Resistor **47** | 6,800 ohms. |
| Resistor **49** | 15,000 ohms. |
| Resistor **50** | 47,000 ohms. |
| Turns ratio inductors **55–56** | 1/7. |
| Inductor **56** range | 100–160 millihenry. |

While the invention is shown in a transistor circuit, it is equally applicable to tube-type circuits. Furthermore, the principle of operation is applicable if the variable capacitance and multiplier transistor are part of the R.C. time constant network of a conventional blocking oscillator.

Thus, the invention provides a new and improved automatic frequency control circuit for a television receiver. The improved circuit employs a variable capacitance device, which inherently has too small a capacitance range to be successfully employed in a low-frequency oscillator, and a multiplying transistor, which effectively multiplies the instantaneous value of the variable capacitance device. With this arrangement a wider range of capacitance values is available and accurate control of a low frequency oscillator is simply and economically achieved.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. In an automatic control circuit including a source of reference signal, a generator having a resonant tank circuit for producing a local signal the frequency and phase of which may be varied, and means for comparing the frequency and phase of said reference signal and said local signal to derive an error signal indicative of their frequency and phase relation, the improvement comprising:

a transistor having emitter, base, and collector electrodes;

a voltage sensitive capacitor coupled between said base and said collector electrodes, said capacitor also being coupled to said comparison means and having an instantaneous capacitance which varies with variations in said error signal;

and means varying the frequency and phase of said oscillator, including means for coupling said base electrode to said tank circuit to present to said tank circuit an impedance substantially equal to the product of the amplification factor of said transistor and the instantaneous value of said capacitance.

2. In an automatic control circuit including a source of reference signals, a generator having a resonant tank circuit for producing a local signal the frequency and phase of which may be varied, and means for comparing the frequency and phase of said reference signal and said local signal to derive an error signal indicative of their frequency and phase relation, the improvement comprising:

a transistor having emitter, base, and collector electrodes;

a voltage sensitive capacitor and a second capacitor having a reactance small relative to that of said voltage sensitive capacitor coupled between said base and said collector electrodes, said voltage sensitive capacitor also being coupled to said comparison means and having an instantaneous capacitance which varies with variations in said error signal;

and means varying the frequency and phase of said oscillator, including a resistor for coupling said base electrode to said tank circuit to present to said tank circuit an impedance substantially equal to the product of the amplification factor of said transistor and the instantaneous value of said capacitance.

References Cited by the Examiner

UNITED STATES PATENTS

| | | | |
|---|---|---|---|
| 3,021,492 | 2/62 | Kaufman | 331—36 X |
| 3,070,657 | 12/62 | Shimada | 331—20 X |

OTHER REFERENCES

Fujimura et al.: "Automatic Frequency Control with Reactance Transistors," Electronics, pp. 97–99, Sept. 30, 1960.

ROY LAKE, *Primary Examiner.*

JOHN KOMINSKI, *Examiner.*